United States Patent [19]

Johnson et al.

[11] Patent Number: 4,706,358
[45] Date of Patent: Nov. 17, 1987

[54] TOOL FOR REMOVAL OF RUBBER EXHAUST HANGERS

[75] Inventors: Daniel C. Johnson, West Chicago; David J. Brummel, Warrenville, both of Ill.

[73] Assignee: Maremont Corporation, Carol Stream, Ill.

[21] Appl. No.: 24,881

[22] Filed: Mar. 11, 1987

Related U.S. Application Data

[63] Continuation of Ser. No. 787,516, Oct. 15, 1985, abandoned.

[51] Int. Cl.⁴ .............................................. B23D 19/02
[52] U.S. Cl. .................................................... 29/235
[58] Field of Search ....................... 29/235; 294/34, 93

[56] References Cited

U.S. PATENT DOCUMENTS

| | | | |
|---|---|---|---|
| 1,054,347 | 2/1913 | Harper | 294/93 |
| 1,090,564 | 3/1914 | Petersen | 294/93 |
| 1,655,744 | 1/1928 | Swanby | 294/93 |
| 4,410,209 | 10/1983 | Trapani | 294/34 |

Primary Examiner—Robert C. Watson
Attorney, Agent, or Firm—Allegretti, Newitt, Witcoff & McAndrews, Ltd.

[57] ABSTRACT

A vehicular exhaust hanger tool for swift, facile removal and installation of vehicular exhaust hangers by which vehicular mufflers are mounted. A hanger hook member with a curved hook is slidably movable along a guide member away from a mounting bracket abutting portion of the guide member to position and flex a hooked hanger.

2 Claims, 4 Drawing Figures

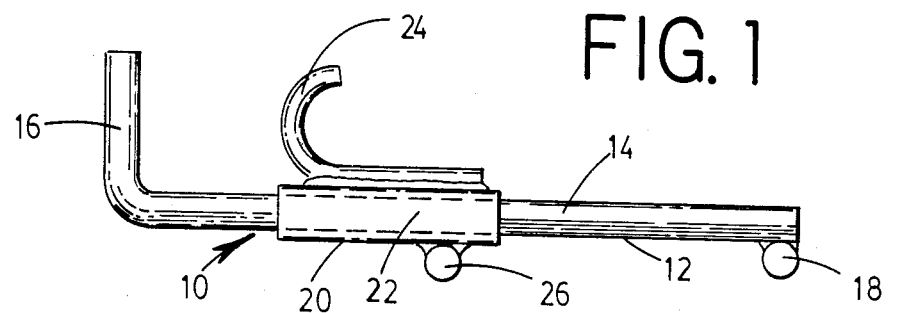
FIG. 1
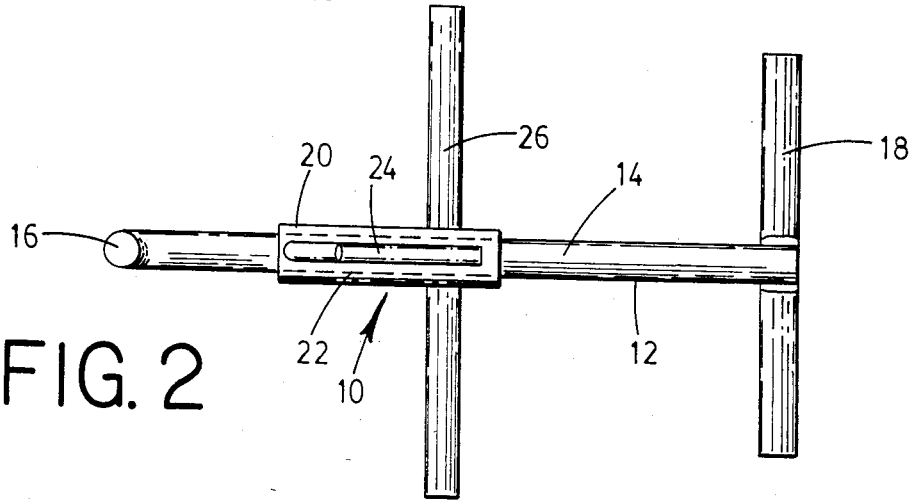
FIG. 2
FIG. 3
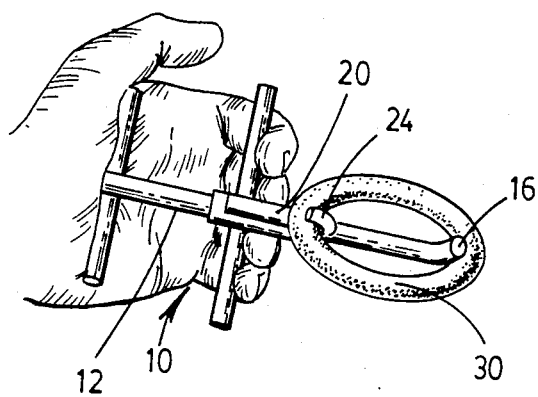
FIG. 4
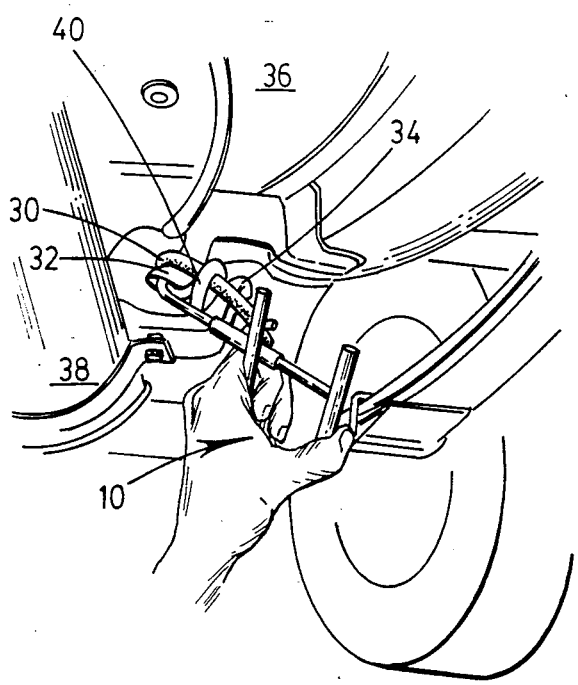

TOOL FOR REMOVAL OF RUBBER EXHAUST HANGERS

This application is a continuation of application Ser. No. 787,516, filed Oct. 15, 1985, now abandoned.

BACKGROUND OF THE INVENTION

This invention relates to hand tools, and more particularly to tools for the installation and removal of vehicular mufflers.

Vehicular mufflers are often held in position beneath vehicle underbodies by exhaust hangers. The hangers are elastomeric, annular rings. First hangers are hooked to upper brackets on the vehicle underbodies and to lower brackets on the muffler bodies. The first hangers suspend the mufflers below the underbodies. Second exhaust hangers are looped over the first hangers and interpose the brackets. The second exhaust hangers prevent contact between the brackets and cushion upward movement of the second brackets and mufflers.

The removal of faulty mufflers requires removal of the exhaust hangers and installation of replacement mufflers requires installation of the exhaust hangers. While vehicles may be placed on hydraulic lifts during such installation and removal, the handling of the exhaust hangers is tricky and time consuming.

SUMMARY OF THE INVENTION

An object of the inventors in making this invention was to speed and facilitate the installation and removal of vehicular muffler exhaust hangers.

Another object was to speed and facilitate such installation and removal in a manner helpful to and compatible with the typical installation and removal, which is (a) manual, (b) accomplished by one worker, and (c) accomplished in a shop which has no room, money or patience for expensive, fragile, bulky, touchy or exotically powered tools.

The invention, which satisfies these and other objects, is in a principal aspect a vehicular exhaust hanger tool comprising two major elements: a guide member and a hanger hook member. The guide member is elongated and includes an upper bracket abutting portion. The hanger hook member includes a hanger hook and is slidable along the guide member. With a preferred hand tool embodiment of the invention, a hanger is removed by hooking the hanger adjacent the lower bracket, setting the upper bracket abutting portion of the guide member against the upper bracket, and manually sliding the hanger hook member along the guide member to stretch the hanger off the lower bracket.

These and other objects, aspects and advantages of the invention are described in more detail in the description of the preferred embodiment of the invention, which follows.

BRIEF DESCRIPTION OF THE DRAWING

FIG. 1 is a side elevation view of the preferred embodiment of the invention;

FIG. 2 is a top plan view of the preferred embodiment of the invention;

FIG. 3 is a perspective view of the preferred embodiment as hand-held and flexing an exhaust hanger; and FIG. 4 is a perspective view of the preferred embodiment as in use.

DETAILED DESCRIPTION OF THE PREFERRED EMBODIMENT

Referring to the figures of the accompanying drawing, the preferred embodiment of the invention is a manual form of the invention, a tool 10. The tool 10 is formed of steel and mostly steel rod. A guide member 12 of the tool 10 includes a steel rod forming an elongated guide portion 14. The rod is angled at a right angle to the longitudinal extent of the guide portion 14 to form a bracket abutting portion 16 at one end. A first cross bar 18 is welded to the guide portion 14 to form a first handle and second end of the guide member 12. The first cross bar 18 extends transverse to the guide portion 14 and at right angles to the bracket abutting portion 16.

A hanger hook member 20 of the tool 10 includes a guided portion 22 slidably mounted on the guide portion 14 of the guide member 12. The guided portion 22 is hollow, cylindrical, and fitted onto the guide portion 14. A hanger hook 24 and a second cross bar 26, both of steel rod, are welded to the guided portion 22.

The hanger hook 24 includes a linear portion welded to the guided portion 22 parallel to the longitudinal extent of the guided portion 22. The hanger hook 24 further includes a hook portion curved approximately 180°. The center of curvature of the hook portion is remote from the bracket abutting portion 16 of the guide member 12, and curves away from the bracket abutting portion 16. In use, the hook portion is maintained in the plane defined by the guide portion 14 and bracket abutting portion 16 of the guide member 12.

The second cross bar 26 extends transverse to the guided portion 22 of the hanger hook member 20, and at right angles to the bracket abutting portion 16. In use, the second cross bar 26 is maintained parallel to the first cross bar 18.

The tool 10 is used as shown in FIGS. 3 and 4. As in FIG. 4, the tool 10 is for assisting the installation and removal of vehicular exhaust hangers such as hanger 30 to and from upper and lower vehicular exhaust mounting brackets such as 32, 34. The upper brackets such as 32 are attached to vehicle underbodies such as underbody 36. The lower brackets such as 34 are attached to muffler bodies such as muffler body 38. The hanger such as 30 is typically a first hanger, with a second hanger such as 40 looped over the first hanger.

For removal of the hangers 30, 40, the hanger 30 is hooked adjacent the lower bracket 34 with the hanger hook portion. The bracket abutting portion 16 of the guide member 12 is then placed against the upper mounting bracket 32. With the upper mounting bracket as a stable surface against which to apply force, the hanger 30 is stretched free of the lower bracket 34. The hanger 30 is stretched by movement of the hanger hook member 20 along the guide portion 14 away from bracket abutting portion 16.

For installation of the hangers 30, 40, the hanger 30 is looped onto the upper bracket 32 by hand. The hanger 30 is hooked on the hanger hook 24 adjacent the lower bracket 34. The bracket abutting portion 16 of the guide member 12 is placed against the upper bracket 32, and the hanger 30 is stretched into place.

The preferred embodiment and the invention are now described in such full, clear, concise and exact terms as to enable a person of skill in the art to make and use the same. To particularly point out and distinctly claim the subject matter regarded as invention, the following claims conclude this specification.

What is claimed is:

1. A vehicular exhaust hanger tool comprising:

an elongated, cylindrical guide member having a straight guide portion, an angled bracket abutting portion and a first cross bar formed a first handle; and a hanger hook member having a cylindrical, tubular, annular guided portion slidably mounted on the guide portion of the guide member, between the bracket abutting portion and the first cross bar, a hanger hook curved away from bracket abutting portion, and a second cross bar forming a second handle;

whereby the tool may be used to install and remove vehicular exhaust hangers from upper and lower mounting brackets by setting the bracket abutting portion of the guide member against the upper brackets, hooking the exhaust hangers with the hanger hook aligned and pointing in either the same direction or a 180 degree rotational direction relative to the bracket abutting portion, and pulling the hanger hook away from the bracket abutting portion, thereby stretching the exhaust hangers for speed and ease of installation and removal to and from the mounting brackets.

2. A vehicular exhaust hanger tool as in claim 1 in which the bracket abutting portion of the guide member forms an end of the guide member, and in which the first cross bar forms another end of the guide member.

* * * * *